United States Patent [19]

Harvey

[11] 4,375,640
[45] Mar. 1, 1983

[54] RADAR SYSTEMS

[75] Inventor: Denis H. Harvey, Newport, England

[73] Assignee: Plessey Handel Und Investments AG, Garternstrasse, Switzerland

[21] Appl. No.: 128,457

[22] Filed: Mar. 10, 1980

[30] Foreign Application Priority Data

Mar. 10, 1979 [GB] United Kingdom ............... 7908520

[51] Int. Cl.³ .............................................. G01S 13/52
[52] U.S. Cl. ............................ 343/5 NQ; 343/5 CF; 343/7.7
[58] Field of Search ................... 343/7.7, 5 CF, 5 NQ

[56] References Cited

U.S. PATENT DOCUMENTS 4,117,538 9/1978 Shrader et al. .............. 343/5 NQ X
4,137,532 1/1979 Taylor, Jr. et al. ................. 343/7.7

Primary Examiner—Malcolm F. Hubler
Attorney, Agent, or Firm—Fleit & Jacobson

[57] ABSTRACT

A radar system comprising a filter with a variable pass band to which radar video signals are fed, data storage means including a main store having a plurality of storage addresses into which data appertaining to the velocity of targets in a plurality of range bearing cells is fed one cell to each address and control signal producing means operative to set the frequency of the filter in dependence upon stored data so that for reception of video signals appertaining to any specified range/bearing cell the frequency of the filter is set in dependence upon the data stored in the address of the main store corresponding to that specified range/bearing cell which appertains to the velocity of any target detected in that range/bearing cell in immediately preceding scans.

10 Claims, 8 Drawing Figures

RADAR SYSTEMS

This invention relates to radar systems and more especially it relates to MTI (moving target indicator) radar systems. In such systems echos from the ground and other stationary targets (ground clutter) are regarded as unwanted signals and rejected. The process by which ground clutter is rejected is well known and usually comprises comparing the phase of successive echo signals. A phase shift between successive echos will obtain only when the echos originate from a target which has a component of radial velocity with respect to the radar system, the phase shift being due to the doppler effect. In general therefore all non-phase shifted echos may be regarded as ground clutter and rejected accordingly.

Clutter may however originate from moving sources such as rain and rain clutter will not be rejected in the ground clutter filter of an MTI radar system. Rain clutter may be rejected by means of a filter if the rain clutter frequency is known but hitherto systems utilizing a rejection filter have not been entirely satisfactory since the required rejection notch frequency of such a filter will vary in accordance with the wind speed and other prevailing atmospheric conditions. Moreover conditions at one range and bearing hereinafter termed a range/bearing cell may differ considerably from the conditions in other range/bearing cells. In particular it will be appreciated that the conditions at various ranges along any specified bearing can be expected to vary widely.

Various adaptive systems have been proposed but all have suffered from the disadvantage that the rejection notch frequency and/or stop band of the filter may under many operating conditions be set at a non-optimum frequencies for a significant percentage of the radar coverage with the result that the signal to noise ratio suffers and the system is unnecessarily de-sensitised. Thus detection of small targets in bad or variable weather conditions may at best be unreliable.

According to the present invention a radar system comprises a filter with a variable pass band to which radar video signals are fed, data storage means including a main store having a plurality of storage addresses into which data appertaining to the velocity of targets in a plurality of range/bearing cells is fed, one cell to each address and control signal producing means operative to set the frequency of the filter in dependence upon stored data so that for the reception of video signals appertaining to any specified range/bearing cell the frequency of the filter is set in dependence upon the data stored in the address of the main store corresponding to that specified range/bearing cell which appertains to the velocity of any target detected in that range/bearing cell in the immediately preceding scans.

The control signal producing means may comprise a ground clutter filter fed with the radar video signals, velocity estimator means responsive to ground clutter free video signals fed from the ground clutter filter for providing during each scan a signal indicative of the velocity of moving targets detected in each range/bearing cell, such signals being fed to the storage means to be stored in the main store at an address corresponding to the range/bearing cell in which it was detected.

The velocity estimator means may include a processor comprising averager means in dependence upon which a signal indicative of the pulse to pulse phase shift is produced averaged over a plurality of range cells, the average output being expressed in terms of a function of .

The average output may be expressed in terms of Tan and fed to conversion means comprising a ROM (read only memory) which provides corresponding signals proportional to which are fed to the storage means.

Method of velocity estimation is;
(i) average over a number of range cells
(ii) average over a number of azimuth cells
(iii) scan to scan update (i) and (ii) does not give unambiguous values of velocity and thus (i) is based on a vector summation of signals in successive range cells. This gives and usually leads to two possible values of velocity. Further estimation based on the variance of these values over a number of received pulses is necessary to decide which value is correct (this is extendable to more ambiguous values).

Having resolved this ambiguity step (iii) is performed.

The storage means may comprise in addition to the main store, a buffer store to which signals from the ROM are fed and combining means in which a signal from the buffer store originating from a target in a particular range/bearing cell is combined with a pre-determined proportion of any signal already stored in the address of the main store appertaining to that range/bearing cell, the output from the combiner means being transferred to the address to update data fed therefrom to the combiner means, whereby the data in each range/bearing cell address of the main store is up-dated each scan in accordance with the said pre-determined proportion.

The proportion may be ⅛, whereby ⅞ of the signal stored and appertaining to each range/bearing cell is additively combined in each scan with fresh data received corresponding to each cell thereby to afford an averaging function in respect of data at each address of the main store.

The variable filter may comprise a plurality of serially connected delay units each delay unit being arranged to feed a multiplicative mixer, the mixers being fed with weighting signals from a coefficient generator operative to set the filter characteristic and combining means fed with the output signals from the mixers and providing an output signal from the variable filter, the coefficient generator being responsive to the addresses of the main store sequentially during each scan so that for reception of echos from a target in a range/bearing cell, the filter characteristic is set responsively to signals from the main store derived in dependence upon the velocity of any rain detected during previous scans in that range/bearing cell.

The system may comprise three channels, a first direct unfiltered radar channel, a second channel including the ground clutter filter, and a third channel including the ground clutter filter and additionally the variable filter operative selectively to reject moving clutter such as rain, output signals from the three channels being fed to a combiner or selector unit.

The storage means may be arranged to store at each address of the main store in addition to velocity related data appertaining to the amplitude of echos in each range/bearing cell, a threshold detector being provided in the direct channel having a variable threshold level below which signals in the direct channel are inhibited, the threshold level being set for the reception of echos during each scan at a level determined in dependence upon the amplitude related signal stored at the corresponding range/bearing cell address of the main store.

The system may be arranged to include a pair of phase sensitive detectors to which radar echo signals are fed, the phase sensitive detectors being fed in phase quadrature from a coherent oscillator to provide I and Q video signal paths. In a system having I and Q signal paths it will be appreciated that the ground clutter filter and the variable filter would be constructed accordingly having I and Q signal paths.

With an I and Q system each channel is provided with an I and Q signal square and adder unit a log unit, a CFAR (constant false alarm rate) unit and an integrator unit, these units being serially connected in each channel the output of the integrators being fed to the signal combiner or channel selector.

Although an analogue system may be provided it is envisaged that the system will be digital and thus the phase detectors would normally be arranged to feed the channels via an analogue/digital convertor operative to convert each analogue signal to a corresponding digital signal.

One embodiment of the invention will now be described by way of example with reference to the accompanying drawings in which.

Figure 1:
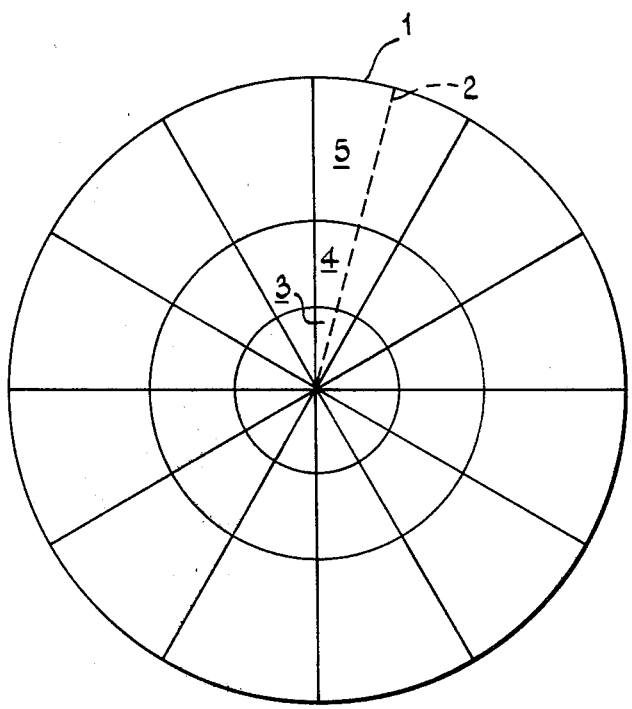
FIG. 1 is a diagram showing the range/bearing cells of a PPI display.

Referring now to FIG. 1 a PPI display 1 can be considered to be divided into a plurality of elements described herein as range/bearing cells, so that on the range indicated by the broken line 2 there are three range/bearing cells 3, 4 and 5. This diagram is by way of explanation only and it will be appreciated that a very large number of different bearings may be considered covering one complete 360° scan and various ranges may be considered along each bearing, the volume of each range/bearing cell being determined in accordance with the particular radar system in view. As just before explained it is an important object of the present invention to provide information concerning the velocity of targets identified in any range/bearing cell, data appertaining to the whole display being stored and utilised during each scan sequentially to set a clutter filter so as to provide optimum filtering conditions for the whole scan.

Figure 2A:
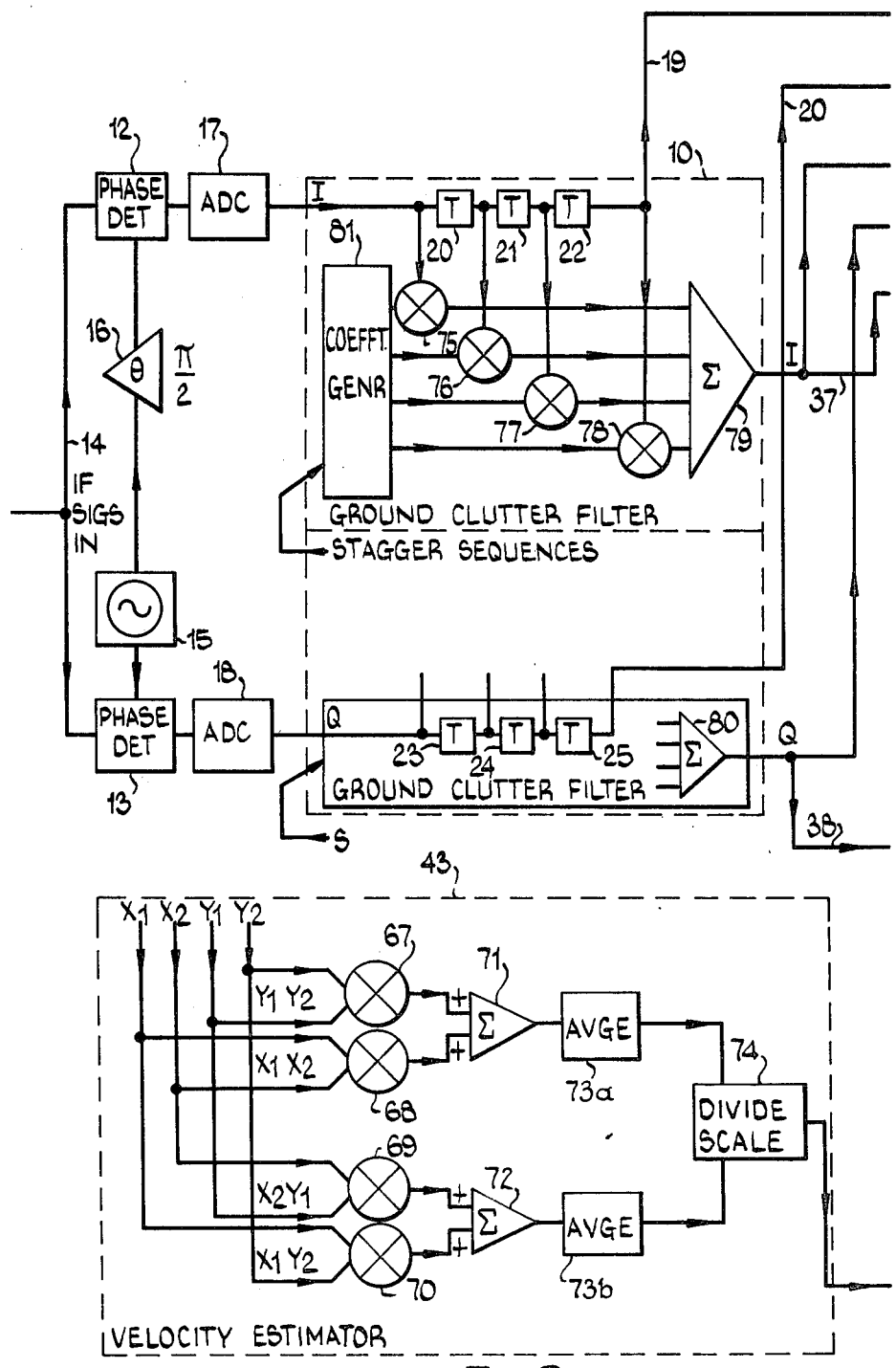
FIGS. 2a–2c are a generally schematic block diagram of a radar system according to the present invention.
Figure 2B:
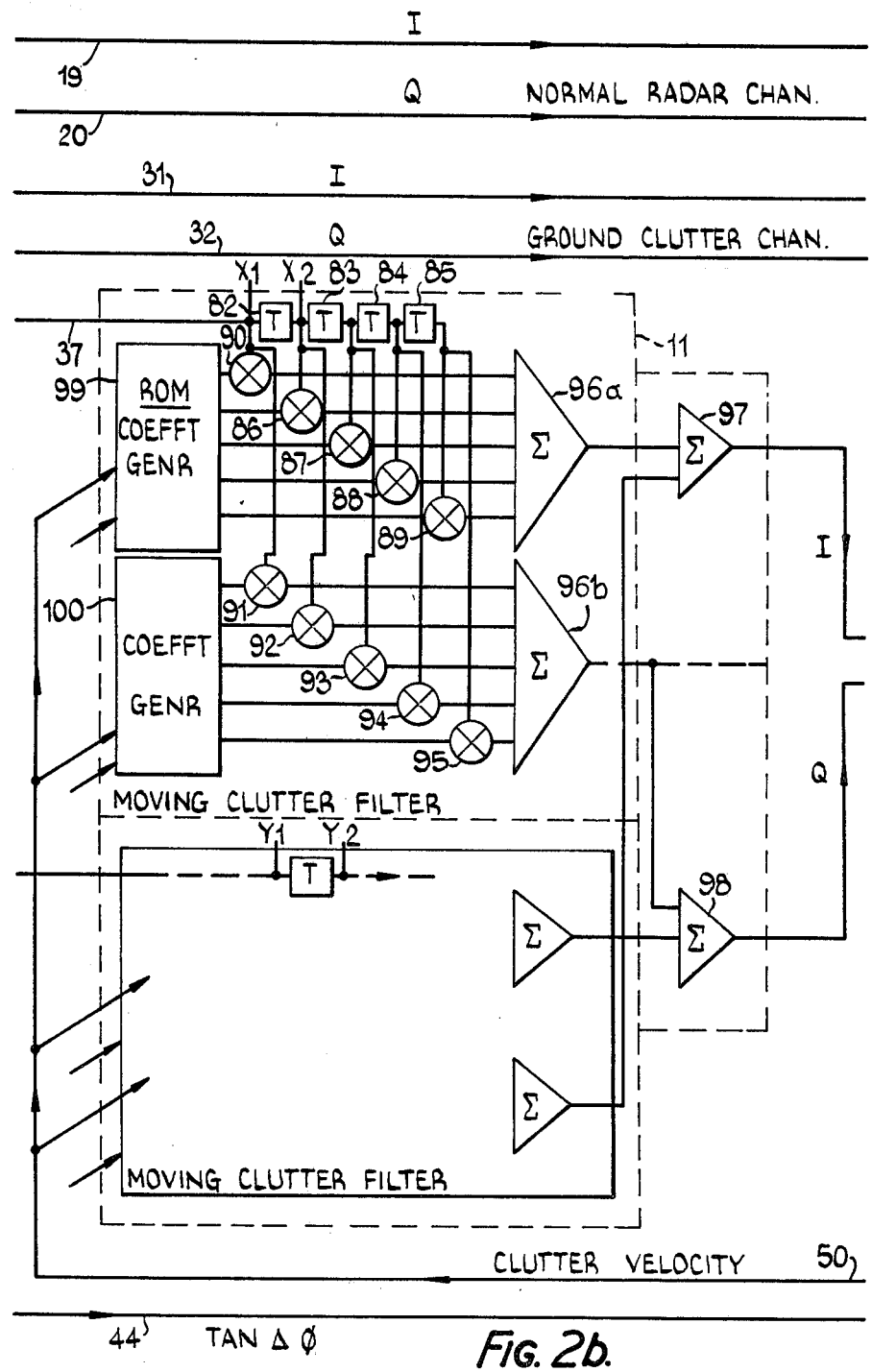
Figure 2C:
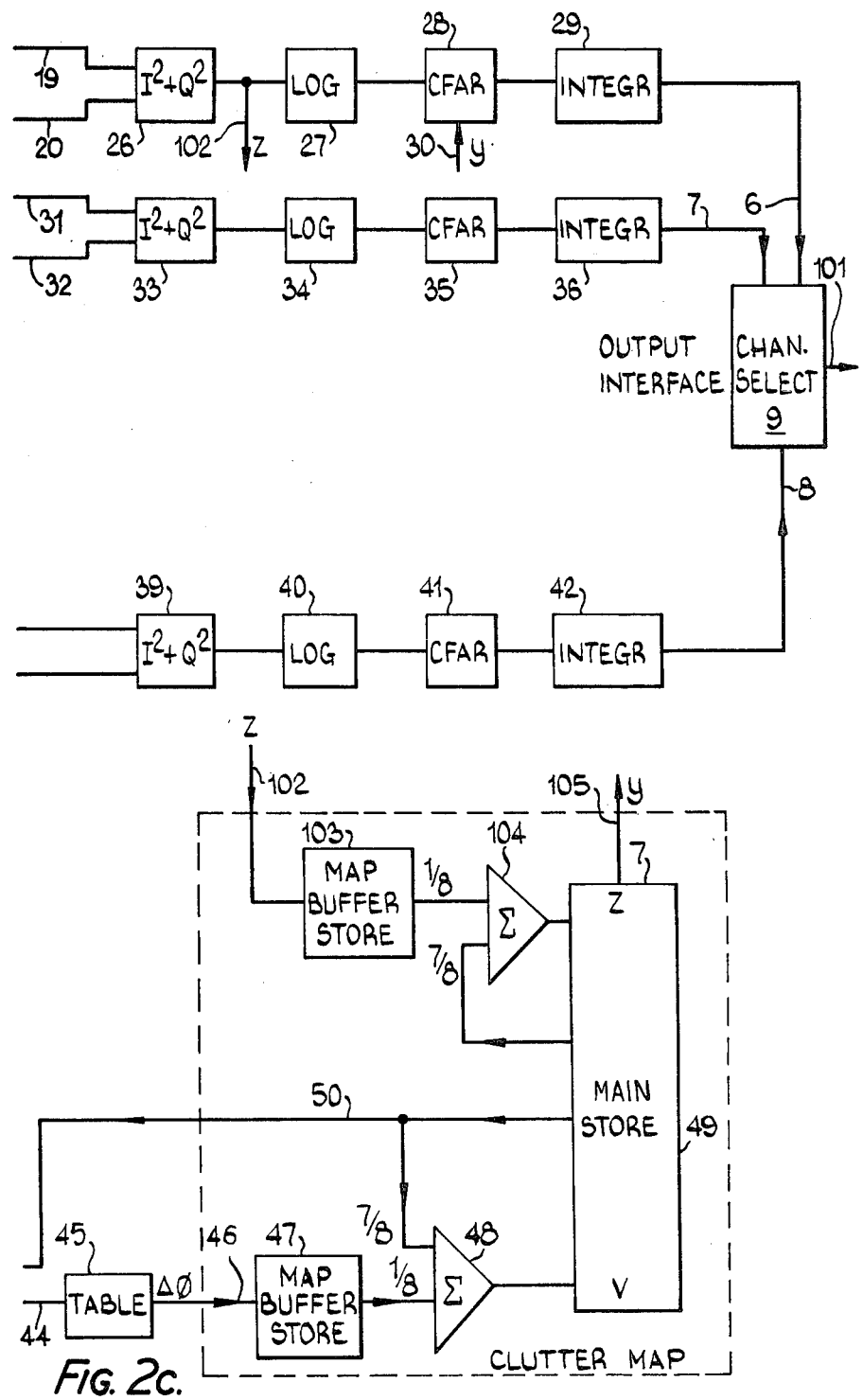

Referring now to FIGS. 2a–2c the system comprises three channels and output signals from the channels on lines 6, 7 and 8 are combined in a channel selector or combiner unit 9. The channel feeding line 6 is a direct channel without clutter filtering. The channel feeding line 7 includes a ground clutter filter which will later be described and is enclosed within the broken line 10. The channel feeding line 8 includes a moving clutter filter which is enclosed within broken line 11 and which will be described in detail later. The three channels are all fed with I and Q video signals derived from a pair of phase sensitive detectors 12 and 13 to which radar echo signals are fed on line 14 and which receive quadrature related coherent oscillator signals from oscillator 15 which is directly coupled to the phase detector 13 and which feeds the phase sensitive detector 12 via a quadrature phase shift network 16.

Although an analogue system may be fabricated, the present system is a digital system and analogue/digital converters 17 and 18 are provided which receive I and Q signals from the phase sensitive detectors 12 and 13 respectively.

The analogue to digital converters 17 and 18 feeding the I and Q signal paths respectively, feed the ground clutter filter 10.

One set of output signals from the ground clutter filter 10 are provided on lines 19 and 20 which are not in fact filtered. The signals on these lines constitute I and Q signals which although not filtered have been delayed by delay networks 20 to 25 of the ground clutter filter 10. The I and Q signals on lines 19 and 20 are squared and then added in square in adder unit 26, which feeds a log unit 27 and signals from the log unit 27 are fed via a CFAR unit 28 and an integrator 29 to provide the direct channel output signals on the line 6.

The log unit 27 simply provides a log output of the signals fed to it. The CFAR unit is operative to pass signals above a certain threshold the threshold being set in dependence upon the rate of noise pulses passed thereby so that the signal to noise ratio of output pulses on the line 6 is improved. The CFAR unit includes a threshold gate (not shown) which in addition to being set as aforesaid, is set in dependence upon a control signal applied thereto on line 30 to control the threshold, and the manner in which this signal is derived will later be described. The integrator 29 is operative to integrate output signals from the CFAR unit 28 over several radar pulse repetition periods.

A further pair of output lines 31, 32 from the ground clutter filter 10 are arranged to feed a square and add unit 33, a log unit 34, a CFAR unit 35 and an integrator 36 to provide the second channel output signal on line 7. The filter 10 is operative to remove ground clutter from the lines 31, 32 and so the output signal on the line 7 will be ground clutter free.

I and Q output signals from the ground clutter filter 10 are also fed via lines 37 and 38 to the moving clutter filter 11. I and Q output signals from the moving clutter filter are fed to square and add unit 39 which feeds log unit 40, CFAR unit 41 and an integrator 42 to provide the output signal on the line 8.

During each scan the velocity of any targets detected in each range cell is estimated by means of a processor shown within broken line 43 the processor being fed with relatively delayed output signals X1 and X2 from the I signal path of the moving clutter filter 11 and with relatively delayed output signals from the Y1 and Y2 from the Q signal path of the moving clutter filter 11. Operation of the velocity estimator 43 will later be described in detail. The velocity estimator 43 provides an output signal on line 44 which is a function of tan , where is a doppler phase shift angle proportional of velocity. The signal on line 44 is fed to a 'look-up table' which comprises a ROM 45 (read only memory) and an output signal from the ROM on line 46 is provided which is directly proportional to target velocity. Signals on the line 46 are fed to a buffer store 47 which performs the functions (ii) and (iii) as herein before explained under the heading velocity estimation and which feeds a combiner 48.

In order to up-date data stored in a particular address of a main store 49, data stored at that address and relating to a particular range/bearing cell is outputted from the store on line 50 and a proportion (⅞ in this case) of the signal on that line is added to a proportional (⅛ in this case) of the output signal from the buffer store 47. The combined output signal from the combiner 48 is then re-entered into the address in the store relating to the particular range/bearing cell. This process is repeated each scan and thus the information in the main store 49 relating to a particular range/bearing cell is updated and averaged over a number of scans.

The addresses in the main store 49 which correspond to a plurality of range/bearing cells are sequentially sampled as the radar is scanned so that all addresses are sampled in each scan, the signals on line 50 being applied to the moving clutter filter 11 to adjust the characteristics of the filter continuously during the scan in dependence upon the velocity dependent signals stored in the main store 49.

It will be appreciated from the foregoing description that the output signal from the third channel on line 8 constitutes a continuously processed doppler signal in which moving clutter such as rain is cancelled.

Operation of the ground clutter filter 10 and the moving clutter filter 11 will now be described in more detail with reference to FIGS. 3, 4, 5 and 6. It is known that filters of the kind shown in FIG. 3 can be used to reject clutter in radar systems. Such filters comprise a delay unit 51 and a subtraction device 52. The delay device 51 has a delay corresponding to the pulse repetition frequency and since doppler shifted signals as would be expected from a moving target are likely to be different from pulse-to-pulse, they will not cancel in the subtraction device 52 and an output signal will be produced whereas consecutive echos from a stationary target will be the same and will therefore cancel. Thus signals from the ground and other stationary targets will therefore not be apparent at the output of a filter of the kind shown in FIG. 3. Some known derivatives of this kind of filter are shown in FIGS. 4 and 5.

Figure 3:
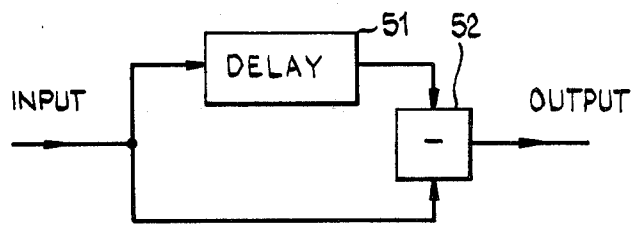
FIG. 3 is a generally schematic block diagram of a clutter filter.
Figure 4:
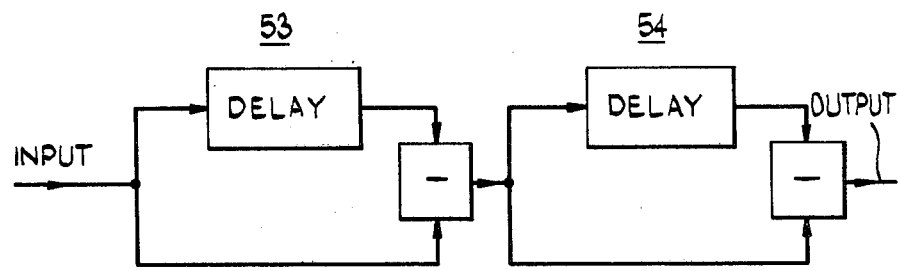
FIG. 4 is a generally schematic block diagram of an alternative form of clutter filter.
Figure 5:
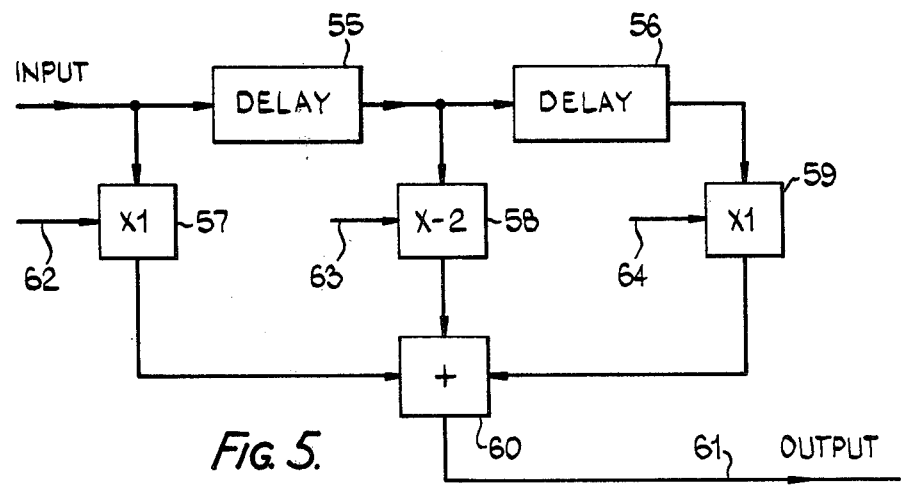
FIGS. 5 and 6 are generally schematic block diagrams of other alternative forms of clutter filter.
Figure 6:
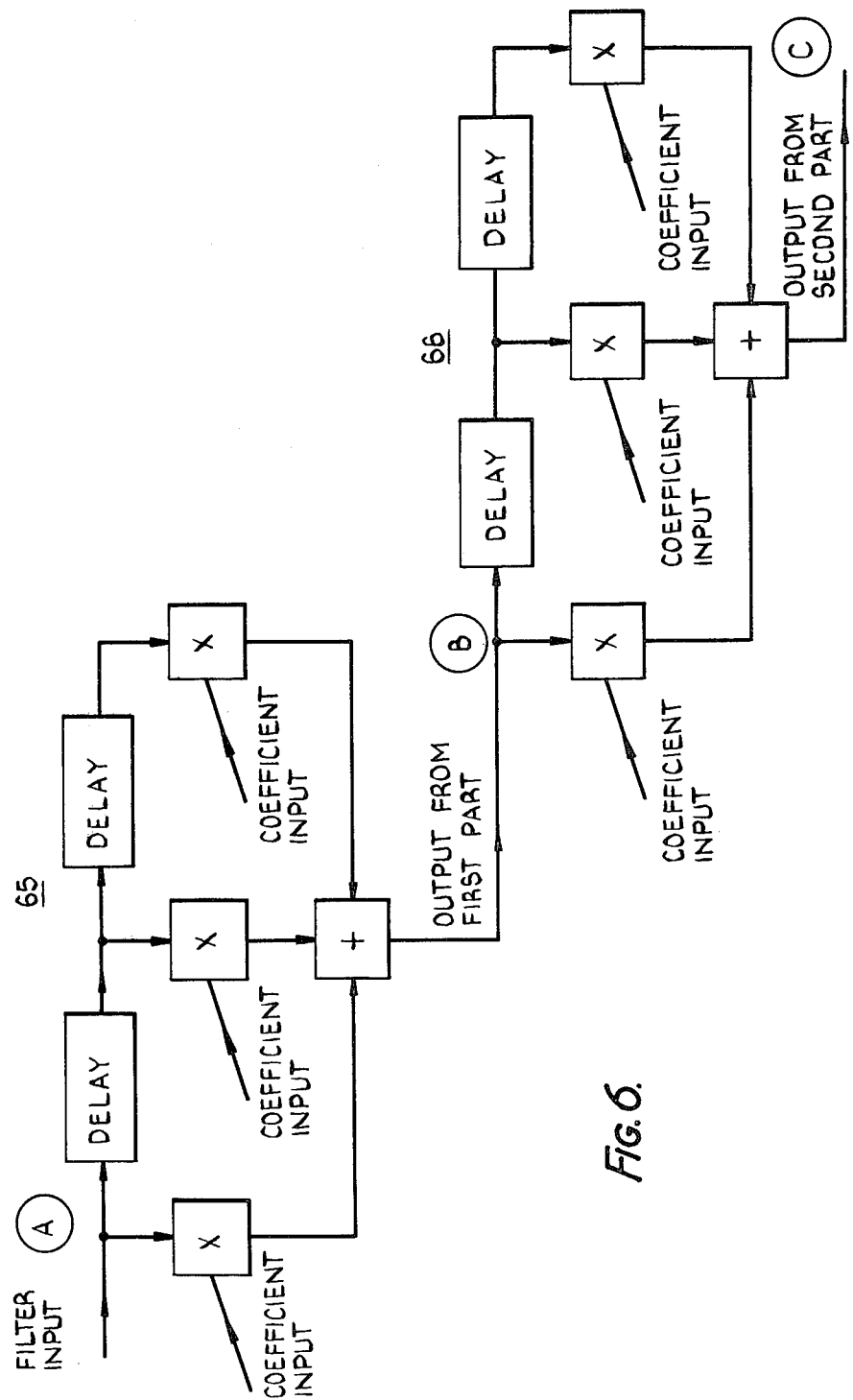

Although a filter of the kind shown in FIG. 4 comprising two cascaded stages 53 and 54 each of which is similar to the arrangement of FIG. 3 has many uses the present invention is more especially concerned with the filter arrangement shown in FIG. 5. The filter shown in FIG. 5 is similar to that shown in FIG. 4 in that it comprises two serially connected stages of delay but differs in that signals delayed by delay devices 55 and 56 are multiplied by coefficients in the multiplication units 57, 58 and 59, the outputs from the multiplication units being additively combined in a combiner 60 to provide an output signal on line 61. By changing coefficients applied to the multipliers 57, 58 and 59 on lines 62, 63 and 64 the characteristic response of the filter may be varied. FIG. 6 shows a filter similar to that shown in FIG. 5 but having two parts 65 and 66. The first part 65 of the filter may be used to reject fixed clutter and corresponds to the filter 10 shown in FIG. 2 whereas the second part may be used to reject moving clutter and corresponds to the filter 11 shown in FIG. 2. Coefficients applied to the first part 65 of the filter might normally be fixed but if a staggered radar pulse repetition frequency is required then it might be necessary to adjust the coefficients of filter section 65 in accordance with the stagger frequency. The coefficients applied to the second part of the filter 66 are determined in accordance with the clutter velocity as determined by the clutter velocity estimator 43 shown in FIG. 2. Having discussed the filters in general with reference to FIGS. 3, 4, 5 and 6 further detailed consideration will now be given to the filters 10 and 11.

The ground clutter filter 10 comprises the delay units 20 to 25 each of which delay the signal by one pulse repetition period and it additionally comprises four multipliers in each of the I and Q signal paths, the I signal path multipliers 75, 76, 77 and 78 only being shown which feed an adder 79. The adder 80 in the Q channel is shown within the broken line 10. The mixers in the I and Q signal paths are each fed from a coefficient generator however the coefficient generator 81 only which is in the I signal path is shown the Q signal path section of the filter being the same as the I section. As described with reference to FIG. 6, the coefficients are adjusted in accordance with the filter characteristic desired and in the case of the ground clutter filter 10, the coefficients are determined in accordance with the stagger pattern required. The moving clutter filter 11 similarly comprises two similar sections comprising I and Q signal paths respectively and the I signal path only will be hereinafter described. The I section comprises four delay networks 82, 83, 84 and 85 which feed four multipliers 86, 87, 88 and 89 a further multiplier 90 being fed directly from line 37. Additionally the filter comprises further mixers 91, 92, 93, 94 and 95 fed in a similar manner from the delay networks 82 to 85. The mixers feed two summing devices 96a and 96b as shown and the outputs from the summing devices in the I and Q signal paths are cross coupled into two further summing devices 97 and 98 which provide the I and Q signals for the squarer and adder unit 39. Signals on line 50 are fed to coefficient generators 99 and 100 shown in the I signal path of the moving clutter filter and to two similar coefficient generators (not shown) in the Q signal path section of the moving clutter filter 11. The signals on line 50 are operative to adjust the coefficients so as to control the characteristic response of the moving clutter filter. Coefficient generators 81, 99 and 100 may simply comprise read only memory devices ROMS which operate after the fashion of a look-up table in response to applied signals, to provide suitable output signals for the mixers with which they are associated according to a predetermined programme. Depending upon the characteristics of prevailing clutter it may be advantageous to detect targets either before any clutter filtering or after the fixed clutter has been filtered or after both the fixed clutter and the moving clutter have been filtered and thus three output channels are provided on lines 6, 7 and 8. Unit 9 is operative either to combine the signals to provide a combined channel output on line 101 from the unit 9 or to provide a selected channel output. Pre-set filter coefficients are selected by a circuit responsive to a signal related to clutter velocity as will now be described in more detail with reference to FIG. 2.

Referring now to FIG. 2 the signals X1, X2, Y1 and Y2 fed to the velocity estimator 43 originate from the ground clutter filter 10 and therefore have ground clutter removed. The input signals to the velocity estimator are fed to four multipliers 67, 68, 69 and 70 which feed two adders 71 and 72. The adders 71, 72 feed averaging circuits 73a and 73b which operate to smooth the velocity over a number of range cells. Output signals from the averagers 73a and 73b are divided and scaled in unit 74 and fed to line 44 as a function of tan. The velocity estimator 43 operates according to an alogrithm which will now be explained.

VELOCITY ESTIMATION ALOGRITHM

Let $x_1 = a \cos$ $x_2 = a \cos(+\Delta)$ $y_1 = a \sin$ $y_2 = a \sin(+\Delta)$ Then $y_1 y_2 = a^2 \sin \sin(+\Delta) = -\frac{1}{2}[\cos(2+\Delta) - \cos \Delta]$ $x_1 x_2 = a^2 \cos \cos(+\Delta) = \frac{1}{2}[\cos(2+\Delta) + \cos \Delta]$ $x_2 y_1 = a^2 \cos(+\Delta) \sin = \frac{1}{2}[\sin(2+\Delta) - \sin \Delta]$ $x_1 y_1 = a^2 \cos \sin(+\Delta) = \frac{1}{2}[\sin(2+\Delta) + \sin \Delta]$ So $y_1 y_2 + x_1 x_2 = a^2 \cos \Delta\phi$
$x_1 y_2 - x_2 y_1 = a^2 \sin \Delta\phi$ $$\frac{x_1 y_2 - x_2 y_1}{y_1 y_2 + x_1 x_2} = \tan \Delta\phi$$

$$\Delta\phi \text{ (ideal)} = \tan^{-1} \frac{x_1 y_2 - x_2 y_1}{y_1 y_2 + x_1 x_2}$$

The above expression for $\Delta$ (ideal) relates to an ideal situation and if used would result in self-cancellation in every range cell. To avoid this averaging over a number of range cells in 73a and 73b of the numerator and denominator yields $$\Delta\phi \text{ (estimated)} = \tan^{-1} \frac{\Sigma (x_1 y_2 - x_2 y_1)}{\Sigma (y_1 y_2 + x_1 x_2)}$$

This estimates $\Delta$, the pulse-to-pulse shift, independent of the initial phase of the signal, and of the signal amplitude a $\Delta$ is found using a look-up table after the division for Tan $\Delta$. The pulse-to-pulse phase shift is proportional to the interpulse period T for a given velocity. In a staggered PRF (pulse repetition frequency) system (T variable) the value of $\Delta$ is corrected by scale factors 45 determined according to the stagger sequence, before the velocity estimates are passed to the map buffer store 47. In this store consideration of the variance of these estimates resolves the ambiguity and a true velocity produced, this is then updated as previously described and passed to the main store 49.

The addresses of the main store are arranged also to store data relating to the amplitude of received echo signals, signals being fed thereto on line 102 via a buffer store 103 associated with a combiner unit 104, the combiner unit 104 and the buffer store 103 operating in a similar manner to the buffer store 47 and combiner 48 to provide a stored value of amplitude in each range/bearing cell which is averaged over several scans. Amplitude representative signals from the main store 49 are fed on line 105 to the input line 30 of the CFAR unit 28 whereby the threshold level is adjusted in the direct radar channel which feeds line 6 so that the signal to noise ratio in the normal radar channels is improved in the presence of clutter.

Various modifications may be made to the arrangement hereinbefore described without departing from the scope of the invention and for example although a digital system has been described it might be more convenient in some circumstances to provide an analogue system although a system has been described which utilises a coherent oscillator 15 to provide output signals from the phase detectors related to 'base-band' frequency it may alternatively be appropriate to provide output signals at some other frequency wherein I and Q signals are not required.

What we claim is:

1. A radar system for the detection of non-clutter type moving targets, comprising:
   velocity estimator means for producing sequentially, in respect of received radar return signals from objects detected during each complete angular scan, corresponding signals indicative of the velocity of the objects;
   averager means responsive to the corresponding signals from the velocity estimator means for providing data appertaining to the average value, over a plurality of angular scans, of the velocity of detected objects;
   main store means having a plurality of storage addresses for receiving and storing the data appertaining to the average value of the velocity of said detected objects as sensed at instants in time corresponding to a corresponding number of range/bearing cells, one cell to each address;
   moving clutter filter means for receiving radar return signals, having a frequency passband which can be varied in response to control signals, and having an output line; and
   control signal producing means for producing control signals for setting the frequency passband of the moving clutter filter means, in dependence upon the data stored in the main store means, to a frequency which reflects an average clutter velocity sensed in a cell during said plurality of scans so that, for the reception of radar return signals in a specified range/bearing cell, the frequency of the moving clutter filter means is set to pass to the output line only those signals having a frequency which corresponds to a velocity which is different from the average clutter velocity sensed in that cell during said plurality of scans, and which could therefore be indicative of a non-clutter type moving target.

2. A radar system as claimed in claim 1, wherein the averager means comprises a buffer store and a summing device connected thereto, and wherein signals derived from the storage addresses in the main store means are provided to the summing device in predetermined proportions with signals derived from the velocity estimator means via the buffer store and appertaining to corresponding range/bearing cells, so that the average value stored at each said storage address is updated from scan to scan.

3. A radar system as claimed in claim 2, wherein the control signal producing means comprises read only memory devices responsive to data stored in the storage addresses of the main store means for providing the control signals which are applied to the moving clutter filter means.

4. A radar system as claimed in claim 3, further comprising a ground clutter filter means for receiving and filtering the radar return signals prior to provision to the velocity estimator means and to the moving clutter filter means.

5. A radar system as claimed in claim 4, further comprising channel selector means for receiving unfiltered radar return signals comprising one channel, for receiving radar return signals via the ground clutter filter means comprising another channel, and for receiving radar return signals via the ground clutter filter means and the moving clutter filter means comprising a third channel, said selector means selecting one of the channels for provision to a display.

6. A radar system as claimed in claim 5, wherein the moving clutter filter means comprises a plurality of serially coupled delay devices provided with radar return signals from the ground clutter filter means, each delay device affording a delay corresponding to a radar pulse repetition period, a plurality of multipliers connected to the delay devices and provided with radar return signals from consecutive radar pulses and with the control signals from the control signal producing means, said plurality of multipliers producing multiplier output signals, and signal combiner means for receiving and combining the multiplier output signals from the multipliers, and providing an output having a frequency response in accordance with the control signals.

7. A radar system as claimed in claim 6, further comprising local oscillator means for providing local oscillator signals, and phase detector means connected thereto for receiving and doppler phase-shifting the radar return signals in accordance therewith so as to provide, from moving targets, doppler phase-shifted signals which are provided to the ground clutter filter means.

8. A radar system as claimed in claim 7, wherein the velocity estimator means comprises a signal processor responsive to relatively delayed signals derived from the delay devices of the moving clutter filter means for providing a signal related to the tangent of doppler phase shifts associated with moving targets, and a read-only memory responsive to the signal provided by the processor for producing a corresponding signal related to phase shift angle, said corresponding signal being fed to the buffer store of the averager means.

9. A radar system as claimed in claim 8, wherein the phase detector means comprises two phase detectors, and further comprising phase quadrature means operatively associated with the local oscillator means for providing quadrature-related outputs to the two phase detectors, thereby to provide I and Q signal channels.

10. A radar system as claimed in claim 9, wherein the main store means includes addresses appertaining to each range/bearing cell for storing data appertaining to the average value of the amplitude of received radar signals, further averager means for deriving the data appertaining to the average value of the amplitude of received radar signals, and a CFAR unit in the said one channel feeding the channel selector means, said CFAR unit including a threshold gate responsive to the stored data appertaining to the average value of the amplitude of received radar signals for adjusting an amplitude threshold above which signals are passed by said threshold gate so as to afford improved signal-to-noise characteristics.

* * * * *